United States Patent [19]

Homan

[11] 4,267,296
[45] May 12, 1981

[54] OXYGEN-CURABLE MERCAPTO-FUNCTIONAL ORGANOSILICON-ORGANIC COMPOUND COMPOSITIONS POSSESSING RAPID SURFACE REACTION AND METHOD OF FORMING HIGHER MOLECULAR WEIGHT PRODUCTS THEREFROM

[75] Inventor: Gary R. Homan, Midland, Mich.

[73] Assignee: Dow Corning Corporation, Midland, Mich.

[21] Appl. No.: 99,284

[22] Filed: Dec. 3, 1979

[51] Int. Cl.$^3$ ............................................ C08G 77/06
[52] U.S. Cl. .................................... 528/15; 260/18 S; 260/37 SB; 528/25; 528/30
[58] Field of Search ............................ 528/15, 30, 25; 260/37 SB, 18 S

[56] References Cited

U.S. PATENT DOCUMENTS

| | | | |
|---|---|---|---|
| 3,312,669 | 4/1967 | Giordano | 260/29.1 |
| 3,445,419 | 5/1969 | Vanderlinde | 260/37 |

FOREIGN PATENT DOCUMENTS

| | | |
|---|---|---|
| 783649 | 4/1968 | Canada . |
| 907436 | 8/1972 | Canada . |
| 911098 | 9/1972 | Canada . |
| 1279475 | 6/1972 | United Kingdom . |

OTHER PUBLICATIONS

Nametkin et al., Journal of Organometallic Chemistry, Elsevier Sequoia S.A., Laussanne, The Netherlands, 149, pp. 355–370 (1978).

Primary Examiner—Melvyn I. Marquis
Attorney, Agent, or Firm—Richard E. Rakoczy

[57] ABSTRACT

Compositions which are stable in the absence of oxygen are formed by mixing the following substantially in the absence of oxygen:

(A) 100 parts by weight of at least one mercapto-functional organosilicon-organic copolymer or mixtures of at least two different types of components selected from the following three types: the above copolymers, mercapto-functional organic compounds free of silicon atoms and mercapto-functional organosilicon compounds wherein all three types contain an average of at least two mercapto groups per molecule;

(B) 0-200 parts by weight of at least one filler;

(C) a catalytic amount, preferably from 0.1 to 6 parts by weight, of an iron carbonyl catalyst selected from the group consisting of $Fe(CO)_5$, $Fe_2(CO)_9$, $Fe_3(CO)_{12}$, dicyclopentadienyldiiron tetracarbonyl, butadieneiron tricarbonyl and cyclohexadieneiron tricarbonyl; and (D) 0.1–6 parts by weight of an acid, such as 2-ethyl-hexanoic acid, which meets a particular set of criteria.

The compositions polymerize or cure to form higher molecular weight products at room temperature upon exposure to oxygen. These compositions are especially useful as coatings such as for paper or as electrical insulation because they possess a rapid rate of surface cure. Elastomeric sealant compositions can be prepared which rapidly become tack-free at the surface and are less prone to surface contamination by foreign matter such as dust during cure.

26 Claims, No Drawings

OXYGEN-CURABLE MERCAPTO-FUNCTIONAL ORGANOSILICON-ORGANIC COMPOUND COMPOSITIONS POSSESSING RAPID SURFACE REACTION AND METHOD OF FORMING HIGHER MOLECULAR WEIGHT PRODUCTS THEREFROM

BACKGROUND OF THE INVENTION

1. Field of the Invention

This invention relates to compositions including copolymers containing sulfur which contain both silicon-free organic segments and organosilicon segments. This invention also relates to compositions including mixtures of at least two different types of components selected from the following three types: the above copolymers, silicon-free organic compounds containing sulfur and/or organosilicon compounds containing sulfur. This invention also relates to a method of forming higher molecular weight products from the above compositions. This invention further relates to organic-organosilicon compound gels, gums, resins and elastomers containing sulfur.

2. Description of the Prior Art

Compositions consisting of mercapto-functional copolymers which contain both silicon-free organic segments and organosilicon segments which are free of aliphatic unsaturation such as vinyl and are polymerized or cured by means of the mercapto groups are known in the art. Many types of curing or condensing agents have been suggested such as inorganic peroxides such as sodium peroxide or lead peroxide; inorganic oxidizing agents such as chromate or permanganate salts; organic peroxides such as benzoyl peroxide; organic hydroperoxides such as cumene hydroperoxide and other organic curing agents such as polyepoxides, polyisocyanates or oximes and the like, many of which are detailed in Canadian Pat. Nos. 783,649 and 911,098.

Vanderlinde, in U.S. Pat. No. 3,445,419, teaches the production of a type of mercapto-functional copolymer consisting of organosiloxanes with mercapto-functional organic compound segments which are prepared by grafting a mercapto-functional carboxylic acid ester such as pentaerythritol tetrakis(3-mercaptopropionate) onto a vinyl-terminated organosiloxane. When an alkaline catalyst such as an amine is added to the resulting graft-copolymer, there is obtained a composition which is stable in the absence of air, but cures to an elastomer at room temperature upon exposure to air.

Curable mixtures of mercapto-functional organic polymers and mercapto-functional organosiloxanes, free of aliphatic unsaturation, are known as exemplified by Pines, et al. in Canadian Pat. No. 907,436. Pines, et al., above; Giordano in U.S. Pat. No. 3,312,669 and British Pat. No. 1,279,475 teach curable mixtures of mercapto-functional organic polymers and organosilanes. None of the above patents suggest the use of iron carbonyl compounds as catalysts nor do they suggest that the acids hereinafter described can be used to accelerate the surface polymerization or cure of such compositions.

Nametkin, et al., in the Journal of Organometallic Chemistry, 149, pp. 355-370 (1978) report that when stoichiometric amounts of $Fe(CO)_5$, $Fe_2(CO)_9$ or $Fe_3(CO)_{12}$ are reacted with thiols of the general formula RSH, where R is an alkyl or aryl radical, in solution, a complex $\{RSFe(CO)_3\}_2$ and a small amount of the disulfide, RSSR, is produced at room temperature and that $Fe_3(CO)_{12}$ is the most effective catalyst. Thermal decomposition of the complex in n-dodecane solution at 160° C. in the presence of air results in decomposition of the complex to form the disulfide. However, this article does not teach that $Fe(CO)_5$, $Fe_2(CO)_9$ or $Fe_3(CO)_{12}$ will function as a catalyst in non-stoichiometric amounts for the room temperature polymerization or cure of the compositions hereinafter described nor does it suggest that the acids hereinafter described will accelerate the surface reaction of such compositions.

Gary R. Homan and Chi-Long Lee are the applicants named in United States Patent Application Ser. No. 99,254, filed on Dec. 3, 1979, entitled "Oxygen Curable Mercapto-Functional Organosilicon-Organic Compound Compositions Catalyzed By Metal Carbonyl Compounds And Method Of Forming Higher Molecular Weight Products Therefrom" which is assigned to the same assignee as is the present invention. In that patent application, Homan and Lee teach that metal carbonyl compounds, especially those containing iron, can be employed as polymerization or cure catalysts in compositions which include (a.) mercapto-functional copolymers which contain both silicon-free organic compound segments and organosilicon segments, or mixtures of (b.) silicon-free mercapto-functional organic compounds and (c.) mercapto-functional organosilicon compounds. Other useful compositions can be prepared from mixtures of at least two different types of components selected from a, b, or c, above. When catalyzed mixtures are prepared and stored in the substantial absence of oxygen, storage-stable compositions which polymerize or cure at room temperature upon exposure to oxygen can be obtained. The products formed upon exposure to oxygen are useful in a variety of applications, for example, as coatings, encapsulating gels, or elastomeric sealants. By varying the ratios of silicon-free organic compounds or segments to organosilicon compounds of segments in the mixtures or copolymers, the properties of the resulting products can be altered to suit the desired end-use.

The advantages of employing organosiloxanes in place of organic polymers are well-known. For example, organosiloxane elastomers are known to be flexible at much lower temperatures than are organic elastomers. Thus, organosiloxanes can be included in organic elastomer formulations to bring about an improvement in the low temperature flexibility of the cured elastomer. Such mercapto-functional compositions are readily cured by means of the metal carbonyl compound catalysts of the present invention simply by exposing the composition to atmospheric oxygen.

Quite unexpectedly, it was discovered that when an acid which satisfies the criteria set out below was included in iron carbonyl catalyzed compositions taught by Homan and Lee, above, the composition exhibited a much faster rate of surface polymerization or cure than did the same compositions without such an acid. Compositions containing such an acid are especially useful where thin films are coated on articles such as wire, paper or electronic circuit boards because the rapid surface cure at room temperature enables the articles to be handled at a much earlier time than compositions which do not contain acid accelerators. Rapid surface cure also reduces the amount of time the surface is tacky and thus vulnerable to contamination by dust or other foreign matter.

DESCRIPTION OF THE INVENTION

This invention relates to a composition, stable in the absence of oxygen, which consists essentially of a product obtained by mixing the following substantially in the absence of oxygen (A) 100 parts by weight of an ingredient selected from the group consisting of
  (1) at least one mercapto-functional copolymer having both organic compound segments and organosilicon compound segments, there being an average of at least two mercapto groups per copolymer molecule and
  (2) a mixture of at least two different types of components, said components being selected from the group consisting of (a) at least one copolymer as described in (A)(1) above, (b) at least one mercapto-functional organic compound which contains an average of at least two mercapto groups per molecule and (c) at least one mercapto-functional organosilicon compound selected from the group consisting of mercapto-functional organosilanes and mercapto-functional organosiloxanes, wherein
  each organic compound segment and mercapto-functional organic compound is free of silicon atoms, aliphatic unsaturation and radicals which are reactive with mercapto groups at room temperature;
  said mercapto-functional organosilanes have an average of at least two mercapto groups per molecule and are of an average formula $$\{(HS)_v Z\}_w SiR_{4-w}^8$$

where
  each Z is a divalent or polyvalent hydrocarbon radical free of aliphatic unsaturation, the valence of Z being $v+1$,
  each $R^8$ is a monovalent hydrocarbon radical free of aliphatic unsaturation or $OR^7$,
  each $R^7$ is an alkyl radical of 1 to 4 inclusive carbon atoms,
  v has a value of greater than 0,
  w has a value of from 1 to 3 inclusive and the sum of $v+w$ has a value of at least 3; and said mercapto-functional organosiloxanes have an average of at least two mercapto-functional siloxane units per molecule selected from the group consisting of mercapto-functional siloxane units of the average unit formula $$\{HSC_nH_{2n}\}_a R_b^9 SiO_{\frac{4-a-b}{2}} \quad \text{and} \quad \begin{array}{c} HSCH-CH_2 \\ | \\ CH_2-CH_2 \end{array} \!\!\!\!\!\! \overset{R_c^9}{\underset{}{SiO_{\frac{2-c}{2}}}},$$

any other siloxane units present having the average unit formula $$R_d^{10} SiO_{\frac{4-d}{2}},$$

where
  each $R^{10}$ is an organic radical selected from the group consisting of $R^9$ and 3,3,3-trifluoropropyl radicals,
  each $R^9$ is $R^6$ or $OR^7$,
  each $R^6$ is an alkyl radical of 1 to 4 inclusive carbon atoms or phenyl radical, n has a value of from 2 to 4 inclusive,
a has a value of from 1 to 2 inclusive,
b has a value of from 0 to 2 inclusive,
c has a value of from 0 to 1 inclusive,
d has a value of from 0 to 3 inclusive and the sum of $a+b$ has a value of from 1 to 3 inclusive, and the ratio of the total $R^6$, $HSC_nH_{2n}-$, $$\begin{array}{c} HSCH-CH_2 \\ | \\ CH_2-CH_2 \end{array} \!\!\!\!\!\! >,$$

and 3,3,3-trifluoropropyl radicals to silicon atoms in the mercapto-functional organosiloxane is in the range of 0.98/1 to 3.00/1;

(B) 0 to 200 parts by weight of at least one filler;

(C) a catalytic amount of an iron carbonyl compound selected from the group consisting of $Fe(CO)_5$, $Fe_2(CO)_9$, $Fe_3(CO)_{12}$, dicyclopentadienyldiiron tetracarbonyl, butadieneiron tricarbonyl, and cyclohexadieneiron tricarbonyl; and, (D) 0.1 to 6 parts by weight of an acid which meets the following criteria:
  (1) it must be compatible with the mixed composition,
  (2) it must be a proton donor, and
  (3) the dissociation constant of the acid in an aqueous solution must be greater than $10^{-5}$.

This invention also relates to a method of forming a higher molecular weight product which consists essentially of the steps of (I) mixing 100 parts by weight of an ingredient as defined in (A) above and a catalytic amount of an iron carbonyl compound as defined in (C) above and 0.1 to 6 parts by weight of an acid as defined in (D) above to form a mixture and (II) exposing said mixture to oxygen. This invention further relates to the product obtained by exposing the above composition or mixture to oxygen.

For purposes of the present application, the following terms will be defined. The term "oxygen" is intended to mean gaseous oxygen which can be in the form of atmospheric or pure oxygen gas. The term "organic compound" is intended to mean both lower molecular weight organic compounds and also organic polymers which do not contain silicon. Such compounds must be free of aliphatic unsaturation and radicals which are reactive with mercapto groups at room temperature such as epoxy and isocyanate. For purposes of discussion, a further distinction will be made by defining a "lower molecular weight organic compound" to be an organic compound possessing a molecular weight of less than 1000 and such term also includes dimeric and trimeric compounds (hereinafter referred to as LMW Compounds). "Organic polymers" are defined as organic compounds possessing a molecular weight greater than 1000 and containing more than three repeating units per molecule (hereinafter referred to as OP Polymers). Because some organic compounds can possess more than three repeating units per molecule and have a molecule weight of less than 1000, such compounds will be classified as OP Polymers solely on the basis of the number of repeating units. "Organosilicon compound" will include both mercapto-functional organosilanes and mercapto-functional organosiloxanes. "Organosiloxane" will include disiloxanes, trisiloxanes and polysiloxanes (hereinafter referred to as OS Polymers). "Mercaptofunctional" is intended to mean that the molecule posseses mercapto groups which are —SH groups in the traditional chemical sense.

Catalyzed compositions being to polymerize or cure upon contact with oxygen. Therefore, the containers used to store the catalyzed compositions should be carefully selected to avoid materials which are sufficiently oxygen permeable to appreciably affect storage stability. Techniques for mixing compositions which are oxygen or moisture sensitive are well-known in the art. Low-shear mixers can be used for lower viscosity compositions while bread dough mixers can be used for more viscous compositions such as sealant formulations which contain fillers.

This invention has two aspects. One is a novel method of polymerizing or curing mercapto-functional organosilicon-organic compound compositions to form higher molecular weight products. The other is directed toward the formation of storage-stable compositions. In order to accomplish the first aspect, one merely exposes a mixture of the mercapto-functional organosilicon-organic compound(s), an acid, and an iron carbonyl compound to oxygen. Thus, is storage stability is not required, the mercapto-functional organosilicon-organic compound(s), acid and iron carbonyl compound, can be mixed together, preferably in that order, in the presence of oxygen and immediately allowed to polymerize or cure.

When storage-stable compositions are desired, the ingredients are mixed together in the substantial absence of oxygen by any well-known means. The preferred procedure is to mix the fillers, if any, acid and mercapto-functional compounds, copolymers and/or polymers under a dry nitrogen atmosphere. The mixture can then be subjected to a vacuum, such as 30 millimeters of mercury, for a short time to remove any trapped oxygen and water. The catalyst can then be added, preferably in a solvent or diluent such as toluene, mineral oil or trimethylsiloxy endblocked polydimethylsiloxane fluid. Many of these catalysts are sensitive to oxygen and can react to form inactive species. The presence of oxygen in catalyzed compositions can also result in premature gelation. It is therefore preferable that the mixed compositions be substantially free of oxygen to maximize storage life.

Mercapto-functional copolymers containing both silicon-free organic compound segments and organosiloxane segments can be random or block and graft copolymers containing at least two mercapto groups per molecule and will hereinafter be referred to as OSO Copolymers. The organic compound segments are free of silicon atoms, aliphatic unsaturation and radicals which are reactive with mercapto groups at room temperature, such as epoxy or isocyanate, which would result in compositions which are not storage stable. For example, copolymers containing both organosilicon compound segments and segments such as organic polyurethane or organic polysulfide are taught in Canadian Pat. Nos. 783,649 and 911,098. In U.S. Pat. No. 3,445,419, Vanderlinde teaches the production of another type of mercapto-functional organosiloxane which can be classified as a graft OSO copolymer. The three immediately preceding patents are hereby incorporated by reference to teach the production of mercapto-functional copolymers useful in compositions of the present invention.

LMW compounds useful in compositions of the present invention are well-known in the art and can be any organic compounds which contain an average of at least two mercapto groups per molecule and are free of silicon atoms, aliphatic unsaturation and radicals which are reactive with mercapto groups, such as epoxy or isocyanate, which would render stored compositions of the present invention unstable. Such compounds can be of the general formula $Q(SH)_x$ where x has an average value greater than or equal to 2 and Q is a divalent or polyvalent hydrocarbon which can also contain heteroatoms such as halogen, oxygen, nitrogen, or sulfur. Such compounds can be monomers, such as 1,2-dimercaptoethane; dimers such as $HS(CH_2)_2SS(CH_2)_2SH$ or $HS(CH_2)_2O(CH_2)_2SH$, trimers such as $HS(CH_2CH_2OCH_2OCH_2CH_2SS)_2CH_2CH_2OCH_2OCH_2CH_2SH$ and polymers such as $HSCH_2COOCH_2(CH_2OCH_2)_yCH_2OOCCH_2SH$ where the average value of y is greater than 3.

Lower molecular weight mercapto-functional organic compounds can be those which are aliphatic such as 1,2-dimercaptoethane, 1,3-dimercapto-3-methylbutane, 1,6-dimercaptohexane, 1,12-dimercaptododecane, or 1,2,3-trimercapto-2-methylbutane; cycloaliphatic such as 1,2,3-trimercaptocyclohexane or 1,2-dimercaptocycloheptane; aromatic such as 1,2-dimercaptobenzene or 3,4-dimercaptotoluene; or alkylaromatic such as alpha,2-dimercaptotoluene. Lower molecular weight mercapto-functional organic compounds containing heteroatoms can be compounds containing oxygen such as ethers such as those of the general formulas $(HSR^1)_2O$ or $HS(C_3H_6O)_2C_3H_6SH$; complete esters such as those of the general formula $(HSR^2COO)_2R^3$, $R^4C(CH_2OOCR^2SH)_3$, $C(CH_2OOCR^2SH)_4$, $(HSR^2COOCH_2)_3CCH_2OCH_2C(CH_2OOCR^2SH)_3$, $\{HSR^2COO(H)C\}\{CH_2OOCR^2SH\}_2$ or $(HSR^2COOCH_2)_3CCH_2OCH_2C(CH_2OOCR^2SH)_2CH_2OCH_2C(CH_2OOCR^2SH)_3$ wherein $R^1$ is alkylene of 2 to 4 inclusive carbon atoms, $R^2$ is alkylene of 1 to 20 inclusive carbon atoms or phenylene, $R^3$ is alkylene of 2 to 6 inclusive carbon atoms and $R^4$ is an alkyl radical of 1 to 2 inclusive carbon atoms. Compounds containing nitrogen can be tris(2-mercaptoethyl)amine, $(HSCH_2CH_2)_2NCH_2CH_2N(CH_2CH_2SH)_2$ or 3,5-dimercaptopyridine; compounds containing sulfur can be $HSCH_2CH_2SSCH_2CH_2SH$ or $HS(C_3H_6)S(C_3H_6)SH$; and compounds containing halogen can be compounds such as 1,3-dimercapto-4-chlorobenzene. The mercapto-functional carboxylic acid esters containing three or more mercapto groups per molecule are preferred. Such esters can be used as the sole type of mercapto-functional organic compound in compositions which cure to resinous products or as cross-linking agents when used in combination with the polymers discussed below. Methods for the preparation of the various types of mercapto-functional organic compounds described above are well-known in the art and can be found in treatises such as The Chemistry of the Thiol Group, Part 1, Patai, editor, John Wiley and Sons, N.Y., pp. 163-269 (1974) and in the patent literature such as in U.S. Pat. No. 4,082,790 which are both hereby incorporated by reference for the purpose of teaching the production of compounds useful in the present invention.

OP Polymers useful in the mixture of the present invention include organic polymers containing an average of at least two mercapto groups per molecule which do not contain silicon such as alkylene sulfide polymers such as those taught in U.S. Pat. Nos. 2,466,963 or 3,056,841; arylene (amylene) sulfide polymers such as those taught in British Pat. No. 1,056,226; oxyalkylene polymers such as those taught in U.S. Pat. No. 3,258,495; urethane polymers such as those taught in U.S. Pat. No. 3,114,734; British Pat. No. 1,133,365 or Canadian Pat. No. 911,098; organic polymers containing different types of organic polymer segments within the same polymer molecule (for example, where one type of segment contains disulfide linkages and the other contains oxyalkylene linkages) such as those taught in Canadian Pat. No. 783,649; and organic polymers wherein the mercapto group has been added to the polymer by esterifying a mercapto-functional carboxylic acid, such as 3-mercaptopropionic acid, to an organic polymer containing free hydroxyl groups, such as a polyalkylene glycol, to produce a polymer of the general formula $(HSGCOO)(R^3OR^3)_y(OOCGSH)$ where G is alkylene of 1 to 20 inclusive carbon atoms or phenylene, and $R^3$ and y are as defined above. The eight immediately preceding patents dealing with polymers are hereby incorporated by reference to teach the production of silicon-free organic polymers useful in compositions of the present invention.

Preferred among the polymers useful in compositions of the present invention are polydisulfidepolymercaptan polymers which are liquid at room temperature, such as those taught by U.S. Pat. No. 2,466,963. Such polymers can be represented by the general formula $HS(R^5SS)_zR^5SH$ where $R^5$ is a divalent hydrocarbon radical, oxyalkylene radical such as $(-C_2H_4OCH_2OC_2H_4-)$, or thiohydrocarbon radical such as $(-C_2H_4SC_2H_4-)$, preferably $R^5$ is selected from the group consisting of divalent oxyalkylene radicals of the general formulas $(-R^1OCH_2OR^1-)$ and $(-R^1OR^1-)$ where $R^1$ is alkylene of 2 to 4 inclusive carbon atoms; z has an average value of 1 to 50, preferably from 4 to 23; and can also include tri-functional and/or tetra-functional molecules such as $\{-SSCH(CH_2SS-)_2\}$ to produce branching in the polymer chain. The preferred polydisulfidepolymercaptan polymers described above can be described as organic polydisulfidepolymercaptan polymers having a molecular weight of approximately 500 to 12,000 which contain multiply recurring disulfide $(-SS-)$ linkages between carbon atoms, exist as a liquid at 25° C. and contain an average of at least two mercapto groups per molecule.

Mercapto-functional organosilanes useful in compositions of the present invention have an average of at least two mercapto groups per molecule and are of a general formula $$\{(HS)_vZ\}_wSiR^8_{4-w}$$

where w was previously defined. The value of v is one less than the valence of Z. Z can be divalent or polyvalent hydrocarbon radical which is free of aliphatic unsaturation and has a valence of v+1 such as divalent hydrocarbon radicals such as ethylene, propylene, 2-ethylhexylene, octadecylene, cyclohexylene, phenylene or benzylene; trivalent hydrocarbon radicals such as 1,2,4-butanetriyl; and polyvalent hydrocarbon radicals such as

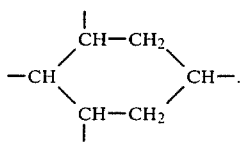

Preferably, Z is a divalent aliphatic hydrocarbon radical which contains from 2 to 4 inclusive carbon atoms.

$R^8$ is a monovalent hydrocarbon radical free of aliphatic unsaturation such as methyl, ethyl, propyl, isopropyl, butyl, isobutyl, octyl, octadecyl, cyclopentyl, cyclohexyl, phenyl, benzyl or naphthyl. $R^8$ can also be $OR^7$, where $R^7$ is an alkyl radical of 1 to 4 inclusive carbon atoms, such as methoxy, ethoxy, propoxy and isobutoxy. Preferably, $R^8$ is an alkyl radical of 1 to 4 inclusive carbon atoms or $OR^7$.

Mercapto-functional organosilanes useful in the compositions of the present invention include organosilanes such as $Me_2Si(CH_2CH_2CH_2SH)_2$, $Me_2Si(CH_2CHCH_3CH_2SH)_2$, $(CH_3CH_2)_2Si(C_6H_5SH)_2$, $(HSCH_2CH_2CH_2)_3SiMe$, $HSCH_2CH(SH)CH_2CH_2Si(OMe)_3$ or $(HSCH_2CH_2CH_2)_2Si(OMe)_2$ where Me is $-CH_3$. Methods for the preparation of mercapto-functional organosilanes useful in the present invention can be found in the literature such as in Gawrys and Post, The Preparation of Certain Carbon-Functional Silathiols and Silathio Esters, Journal Of Organic Chemistry, Vol. 27, p. 634ff. (1962), and in U.S. Pat. No. 4,082,790 which are hereby incorporated by reference to teach the production of a type of mercapto-functional organosilanes useful in the present invention.

Mercapto-functional organosiloxanes, also referred to as mercaptoorganosiloxanes, are useful in compositions of the present invention. The substituents attached to silicon atoms can be $R^{10}$ which can be $R^9$ or 3,3,3-trifluoropropyl radicals. $R^9$ can be $R^6$ which can be alkyl radicals of 1 to 4 inclusive carbon atoms, such as methyl, ethyl, propyl, isopropyl and butyl, or phenyl radicals, or alkoxy radicals of the formula $OR^7$, where $R^7$ is an alkyl radical of 1 to 4 inclusive carbon atoms, such as methoxy, ethoxy, isopropoxy, or butoxy. The mercapto-functional substituents present in the form of $HSC_nH_{2n}$, where n is 2 to 4, can be, for example, beta-mercaptoethyl, gamma-mercaptopropyl, 3-mercaptobutyl, and 3-mercapto, 2-methylpropyl. Another mercapto-functional substituent can be 2-mercaptotetramethylene where both ends of the radical are attached to the same silicon atom.

The siloxane units containing no mercapto groups which have the average unit formula $R^{10}_dSiO_{(4-d)/2}$ can be $SiO_2$ units, monosubstituted units such as monomethylsiloxane units, monoethylsiloxane units, monopropylsiloxane units, monobutylsiloxane units, or monophenylsiloxane units; disubstituted units such as dimethylsiloxane units, diethylsiloxane units, diphenylsiloxane units, phenylmethylsiloxane units, methylbutylsiloxane units, phenylethylsiloxane units, 3,3,3-trifluoropropylmethylsiloxane units, and methylisopropylsiloxane units; and trisubstituted units such as trimethylsiloxane units, phenyldimethylsiloxane units, triethylsiloxane units, diphenylmethylsiloxane units, diphenylisopropylsiloxane units, 3,3,3-trifluoropropyldimethylsiloxane units, diphenylbutylsiloxane units and triphenylsiloxane units.

The mercapto-functional siloxane units which have the average unit formula

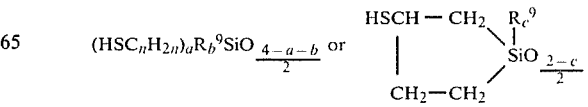

include the following $HSC_nH_{2n}SiO_{1.5}$,

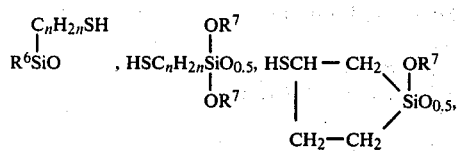

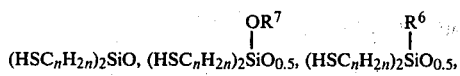

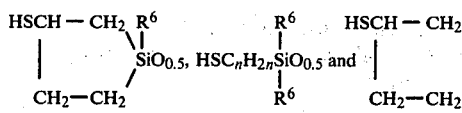

wherein $R^6$, $R^7$ and n are as defined above and n preferably has a value of 3. Mercaptoorganosiloxanes useful in the present invention contain an average of at least two mercapto-functional siloxane units per molecule.

Pendant-functional mercaptopolydiorganosiloxanes useful in compositions of the present invention are mercaptopolydiorganosiloxanes containing $R_3^6SiO_{0.5}$ endblocking siloxane units and mercapto-functional siloxane units selected from the group consisting of

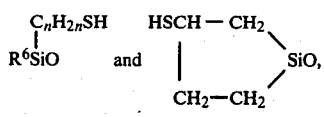

any remaining siloxane units being $R_2^6SiO$, wherein $R^6$ and n are defined above, the average number of mercapto-functional siloxane units per molecule is greater than 2 and the number average molecular weight of the pendant-functional mercaptopolydiorganosiloxane is less than 400,000.

Preferably, especially when these mercaptopolydiorganosiloxanes are used in elastomeric sealant formulations, $R^6$ is methyl, n is 3, and the pendant-functional mercaptopolydiorganosiloxane has a number average molecular weight of less than 100,000 and contains a sufficient number of mercapto-functional siloxane units to result in a percentage of mercapto groups in the range of 0.14 to 2.5 percent based on the total weight of pendant-functional mercaptopolydiorganosiloxane.

Terminal-functional mercaptopolydiorganosiloxanes useful in compositions of the present invention are mercaptopolydiorganosiloxanes containing mercapto-functional siloxane units selected from the group consisting of $HSC_nH_{2n}(R^6)_2SiO_{0.5}$, $HSC_nH_{2n}(R^7O)_2SiO_{0.5}$,

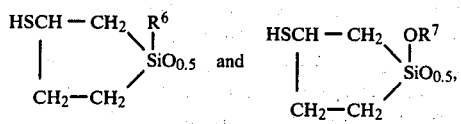

any remaining siloxane units being $R_2^6SiO$, wherein $R^6$, $R^7$ and n are defined above and the number average molecular weight of the terminal-functional mercaptopolydiorganosiloxane is less than 400,000. Preferably, each $R^6$ is methyl, n is 3, the mercapto-functional siloxane units are selected from the group consisting of $HSCH_2CH_2CH_2(CH_3)_2SiO_{0.5}$ and

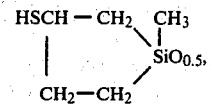

the number average molecular weight of the mercaptopolydiorganosiloxane is less than 100,000 and the weight percentage of mercapto groups present is in the range of 0.07 to 0.45 percent of the total weight of terminal-functional mercaptopolydiorganosiloxane.

Another type of mercaptopolydiorganosiloxane useful in compositions of the present invention is a terminal-functional mercaptopolydiorganosiloxane which also contains pendant mercapto-functional siloxane units (hereinafter referred to as hybrid-functional mercaptopolydiorganosiloxanes). Such mercaptopolydiorganosiloxanes contain two mercapto-functional siloxane units selected from the group consisting of $(HSC_nH_{2n})R_2^6SiO_{0.5}$, $(HSC_nH_{2n})(R^7O)_2SiO_{0.5}$,

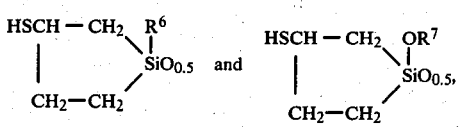

and at least one mercapto-functional siloxane unit selected from the group consisting of siloxane units of the formula $(HSC_nH_{2n})R^6SiO$ and

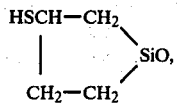

any remaining siloxane units being $R_2^6SiO$, wherein $R^6$, $R^7$ and n are defined above and the number average molecular weight of the hybrid-functional mercaptopolydiorganosiloxane is less than 400,000. Preferably, each $R^6$ is methyl, n is 3, the terminal mercapto-functional siloxane units are selected from the group consisting of $HSCH_2CH_2CH_2(CH_3)_2SiO_{0.5}$ and

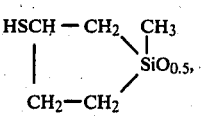

and the hybrid-functional mercaptopolydiorganosiloxane has a number average molecular weight of less than 100,000 and contains a sufficient number of mercapto-functional siloxane units to result in a weight percentage of mercapto groups in the range of 0.14 to 3 percent based on the total weight of hybrid-functional mercaptopolydiorganosiloxane.

The methods for preparing the above mercaptopolydiorganosiloxanes are well-known in the art. One method for making a type of pendant-functional mercaptopolydiorganosiloxane containing $HSC_nH_{2n}(R^6)SiO$ and $R_3^6SiO_{0.5}$ siloxane units is taught by Viventi in U.S. Pat. No. 3,346,405. Another method is taught in the Bokerman, et al, patent described previously. For example, Example 1 of the Bokerman, et al, patent teaches the production of a pendant-functional mercaptopolydiorganosiloxane which is a trimethylsiloxy-endblocked copolymer consisting of about 94 mole percent dimethylsiloxane units and about 5 mole percent 3-mercaptopropylmethylsiloxane units. Le Grow, in U.S. Pat. No. 3,655,713 teaches a procedure for making both pendant-functional and terminal-functional mercaptopolydiorganosiloxanes containing siloxane units possessing 2-mercaptotetramethylene substituents.

Several methods for producing terminal-functional mercaptodiorganosiloxanes containing $HSC_nH_{2n}R_2^6SiO_{0.5}$ siloxane units are known. One method involves the use of a disiloxane bearing a silicon-bonded mercaptoalkyl radical, such as sym-tetramethyl bis(3-mercaptopropyl)disiloxane, and a cyclic polydiorganosiloxane such as octamethylcyclotetrasiloxane. Appropriate amounts of the mercapto-functional disiloxane and cyclic polydiorganosiloxane are heated together with an acidic catalyst such as trifluoromethanesulfonic acid for 3 to 8 hours. The mixture is then neutralized and the mercapto-terminated polydiorganosiloxane is recovered. Hybrid-functional polymers can be prepared using the same type of compounds and techniques outlined above for producing terminal-functional mercaptopolydiorganosiloxanes by adding a cyclic mercaptopolydiorganosiloxane such as $\{HSCH_2CH_2CH_2(CH_3)SiO\}_{\sim 4}$ to the reaction mixture to introduce pendant-functional groups into the mercaptopolydiorganosiloxane. Likewise, the compounds and techniques used in preparing pendant-functional mercaptopolydiorganosiloxanes can be used to produce hybrid-functional types by substituting mercapto-functional endblocking units, which can be introduced in the form of a disiloxane such as sym-tetramethyl bis(3-mercaptopropyl)disiloxane, in place of non-functional endblocking units, such as those introduced in the form of hexamethyldisiloxane, in the reaction mixture.

Cyclic mercaptopolydiorganosiloxanes can be prepared by various methods, one of which involves preparing the corresponding chloroalkylsilane, such as 3-chloropropylmethyldichlorosilane, and hydrolyzing the silanes to form a mixture of linear and cyclic polydiorganosiloxanes. If desired, the ratio of cyclic to linear polydiorganosiloxanes can be altered by heating in the presence of an acidic catalyst for a period of time, during which time a portion of the cyclic polydiorganosiloxanes formed is being removed by distillation to shift the equilibrium of the reaction in the direction which favors the formation of cyclic polydiorganosiloxanes. Then, for example, Viventi teaches that the chloroalkyldiorganosiloxanes can be reacted with sodium sulfohydride to produce mercaptopolydiorganosiloxanes. Mercapto-functional silanes containing alkoxy groups such as 3-mercaptopropylmethyldimethoxysilane can also be hydrolyzed at about 40°–50° C. in the presence of an acidic catalyst and vacuum-stripped at 120° C. to remove alcohol and other undesirable volatiles present. Such mixtures can also be referred to as, for example, the 3-mercaptopropylmethyl hydrolyzate of 3-mercaptopropylmethyldimethoxysilane. Other means for preparing cyclic mercaptopolydiorganosiloxanes will be apparent to persons skilled in the art.

The production of a type of mercapto-functional organosiloxane resins by the partial hydrolysis of mixtures of silanes such as $HSC_nH_{2n}Si(OR^7)_3$ and $R_2^6Si(OR^7)_2$ is demonstrated by the Viventi patent. Likewise, mercapto-functional organosiloxane resins result when a sufficient number of siloxane units such as $R^6SiO_{1.5}$ are present in the mercaptoorganosiloxanes taught in the Le Grow patent. The Viventi, Le Grow and Bokerman, et al, patents are hereby incorporated by reference to teach the production of mercaptoorganosiloxanes useful in compositions of the present invention.

Mercaptopolydiorganosiloxanes which contain endblocking units of the formula

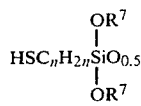

can be prepared by reacting a hydroxyl endblocked polydiorganosiloxane and a (mercaptoalkyl)trialkoxysilane of the formula

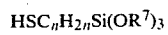

in the presence of solid potassium hydroxide or potassium silanolate catalysts. The potassium silanolate catalyst is preferred for higher viscosity polydiorganosiloxanes. The (mercaptoalkyl)trialkoxysilane is preferably used in an excess of about 10 mole percent over stoichiometric amounts. The resulting product is essentially a polydiorganosiloxane endblocked with units of the formula

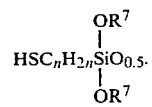

There may be some small amount of units wherein two SiOH groups have reacted with one (mercaptoalkyl)trialkoxysilane molecule, but these amounts are small enough that the character of the endblocked polydiorganosiloxane is not noticeably altered.

Fillers may be used with the compositions of this invention, but are not required. Extending fillers can preferably be used in amounts of 10 to 200 parts by weight per 100 parts by weight of mercapto-functional organosilicon-organic compound mixture, especially in the elastomeric sealant formulations. Suitable extending fillers can be titanium dioxide, calcium carbonate, talc, clay, ground or crushed quartz, diatomaceous earth, fibrous fillers such as glass or asbestos and the like. Reinforcing fillers such as fume silica, surface-treated fume silica, carbon black and the like may also be used. As is well-known in the art, reinforcing fillers cannot be used in as large an amount as extending fillers can be used, thus any formulation including such fillers would not contain more than 70 parts by weight of reinforcing fillers per 100 parts by weight of mercapto-functional organosilicon-organic compound mixture and preferably, from 5 to 30 parts. Extending fillers can also be included in formulations containing reinforcing fillers in amounts of up to 200 parts by weight per 100 parts by weight of mercapto-functional organosilicon-organic compound mixture less the amount of reinforcing filler present. Other additives such as coloring pigments, fire-retarding compounds and the like are also contemplated as being useful in the present invention. Routine testing can determine the effect of fillers and additives on shelf life.

Iron carbonyl compounds contemplated as being useful as catalysts in the practice of the present invention are $Fe(CO)_5$, $Fe_2(CO)_9$, $Fe_3(CO)_{12}$, dicyclopentadienyldiiron tetracarbonyl or $\{(C_5H_5)Fe(CO)_2\}_2$, butadieneiron tricarbonyl or $(C_4H_6)Fe(CO)_3$, and cyclohexadieneiron tricarbonyl or $(C_6H_8)Fe(CO)_3$. The amount of catalyst necessary is not critical. Any catalytic amount can be employed which will adequately polymerize or cure the compositions in the presence of oxygen to result in a product which is satisfactory for the desired end use. Changing the level of catalyst may alter the polymerization or cure rate and can alter the properties of the cured product, especially in the elastomeric products. I have found that a range of 0.1 to 6 parts by weight of iron carbonyl compound per 100 parts by weight of mercapto-functional compounds present is usually sufficient. The preferred iron carbonyl compound is $Fe(CO)_5$.

As noted previously, the iron carbonyl compounds are affected by exposure to oxygen and thus their catalytic activity can be reduced during handling if steps are not taken to protect them from such exposure. Thus, to aid in the handling of the compounds and to further speed the incorporation of the catalyst into the composition, it is preferable to first dissolve the compounds in a hydrophobic solvent or diluent such as toluene, mineral oil or a trimethylsiloxy endblocked polydimethylsiloxane fluid. A 20 weight percent solution of iron pentacarbonyl $(Fe(CO)_5)$ in a trimethylsiloxy endblocked polydimethylsiloxane fluid is preferred. Iron carbonyl compounds are well-known in the art and methods for their preparation may be found in the literature, for example, in Organometallic Compounds, Volume I, Dub, editor, Springer-Verlag, N.Y. (1966) and Handbook of Organometallic Compounds, Hagihara, Kumada and Okawara, editors, W. A. Benjamin Co., N.Y., pp. 822–903 (1968), which are both hereby incorporated by reference to teach the production of the above iron carbonyl compounds. Iron carbonyl compounds are known to be toxic and somewhat volatile, therefore care should be exercised when such compounds are handled and adequate ventilation should be provided during the polymerization or cure of these compositions.

To be useful as a surface-polymerization or surface-cure accelerator, an acid must meet three criteria: (1) it must be compatible with the mixed composition, (2) it must be a proton donor, and (3) the dissociation constant of the acid in aqueous solution must be greater than $10^{-5}$.

For purposes of the present application, the term "compatible" is intended to mean an acid which is sufficiently soluble in the mercapto-functional organosilicon-organic compound composition to allow it to become homogeneously incorporated. For example, an acid which is not soluble in the mercapto-functional organosilicon-organic compound composition generally cannot become homogeneously incorporated even when the acid is first dissolved in a solvent which is compatible with both the acid and the mercapto-functional organosilicon-organic compounds present. The acid may initially appear to become homogeneously incorporated, but can later rise to the surface of a stored composition and will not have the desired accelerating effect on the rate of polymerization or cure. Furthermore, lack of solubility generally can result in a reduced or non-existent accelerating effect even if the acid does not immediately begin to separate from the composition.

The term "compatible" is also intended to mean that the acid is not sufficiently reactive with the composition during storage and/or after polymerization or cure to render the composition or cured product unsatisfactory for its intended use. For example, the presence of hydrochloric acid is known to catalyze depolymerization of polyorganosiloxanes. Such depolymerization can result in a deterioration in the properties of the cured product.

The term "proton donor" is intended to mean that an acid suitable for use in the present invention must be a proton donor in accordance with the generally accepted Lowry-Bronsted definition, i.e., an acid is a substance which gives up a proton and a base is a substance that accepts a proton. Thus, an acid which gives up a hydrogen ion upon dissociation, such as acetic or sulfuric acid, is a proton donor under this definition and meets the second criterion. Not all Lewis acids, which are defined as electron-pair acceptors and include compounds such as boron trifluoride, meet the requirements of the second criterion.

The tendency of an acid to give up a proton is referred to as acid strength and a commonly accepted measure of acid strength is the acidic dissociation constant (usually symbolized by $K$, $K_A$ or $K_a$) of the acid in an aqueous solution. Such constants have been extensively studied and are readily available in the literature. Polybasic acids which are capable of donating more than one proton per molecule have a separate dissociation constant listed for each proton and for purposes of the present invention, only the dissociation constant of the first proton is used in determining whether the acid meets the third criterion. Acid strength increases as the value of the dissociation constant increases and acids with values of $K$ (for the first proton to dissociate) greater than $10^{-5}$ are required for use in the present invention. For example, the dissociation constant for acetic acid is $K=1.76\times 10^{-5}$, as reported in a table in the Handbook of Chemistry and Physics, 50th Edition, Weast, editor, The Chemical Rubber Co., Cleveland, OH, p. D-118f. (1969), which table is hereby incorporated by reference to teach various acids which can be used in compositions of the present invention. Since the dissociation constant for acetic acid is greater than $10^{-5}$, acetic acid would satisfy the third criterion.

Both monobasic and polybasic organic and inorganic acids can be used as accelerators if the above three criteria are met. Preferably, carboxylic acids such as acetic, hexanoic, 2-ethylhexanoic and octanoic acid can be used. I have discovered that 2-ethylhexanoic acid is a preferred acid because it is a liquid which is easily incorporated and is much less volatile than acids such as acetic. A unique type of acid accelerator would be carboxylic acids which additionally contain mercapto groups, preferably, those containing two or more mercapto groups, such as $(HSCH_2)_2CHCO_2H$ or 2,3-dimercaptosuccinic acid, which would become a part of the polymer structure upon curing. Acids which are solids at room temperature may be added as solutions in solvents which are compatible with both the acids and the mercapto-functional organosilicon-organic compound composition. Such acid accelerators are useful in the present invention when added in amounts in the range of 0.1 to 6 parts by weight of acid per 100 parts by weight of mercapto-functional organosilicon-organic compound in the formulation.

Acids satisfying the second and third criteria are easily discovered by reference to tables in the literature and such tables can serve as a guide for selecting acids useful as accelerators. The compatibility of a selected acid with the formulation is a very important criterion and can readily be determined by one skilled in the art through routine testing. For example, storage stability testing can be used to indicate solubility problems which will be evidenced by a loss or absence of accelerated surface cure rate when compared to formulations which do not contain an acid accelerator. Thus, formulations used to coat electrical wires which generate heat during use can be cured and subjected to accelerated heat stability tests to determine if the presence of the acid chosen significantly affects the properties of the cured coatings. If the acid causes an unacceptable amount of deterioration in properties when compared to a formulation containing another type of acid or a formulation without acid accelerator, that acid is not compatible for purposes of the present invention and fails to meet the first criterion. However, the same acid may be compatible when used in a formulation with a different end-use such as in a paper coating.

Compositions useful in the present invention can be prepared in a number of ways. OSO Copolymers can be used as the sole mercapto-functional ingredient provided that the OSO Copolymer contains an average of greater than two mercapto groups per molecule. Compositions can also be prepared by selecting at least two of the following three types of components for use in a mixture: (a) OSO Copolymers, (b) mercapto-functional organic compounds, and (c) mercapto-functional organosilicon compounds. For example, the mixture could consist of an OSO Copolymer containing an average of two mercapto groups per molecule and an LMW Compound containing an average of six mercapto groups per molecule. Likewise, such mixtures can be an OSO Copolymer and an OS Polymer; a mercapto-functional organosilane and an OP Polymer; or a mixture of all three types such as an OSO Copolymer, an LMW Compound and an OS Polymer. When mixtures are used, the components should be sufficiently compatible with one another to enable a stable composition to be formed which will not appreciably separate upon storage. The various combinations possible will be readily apparent to one skilled in the art.

Several means for obtaining a cured product with particular properties are available. Organosiloxanes are known to possess a number of advantages over organic polymers such as outstanding weathering, heat resistance, low temperature flexibility, resistance to degradation by ozone and much higher permeability to gases such as oxygen. On the other hand, organosiloxanes tend to be more expensive than organic polymers and some types of organosiloxanes can possess poorer adhesion to certain substrates than organic polymers such as polyurethane polymers. For example, one can employ a blend of OS Polymers, LMW Compounds and/or OP Polymers to produce a cured product which possesses improved physical properties when compared to a formulation consisting only of the LMW Compounds and/or OP Polymers, but is much more economical than a formulation consisting only of OS Polymers. Thus the character and cost of the cured product can be altered by simply varying the weight ratio of mercapto-functional organosilicon compound to mercapto-functional organic compound in the formulation. Likewise, the weight ratio of organosilicon compound segments to organic compound segments in the OSO Copolymer can be altered to produce a cured product with a particular set of properties. Iron carbonyl catalysts provide a convenient means to polymerize or cure such compositions into useful products.

The properties of the product obtained upon exposure to oxygen can also be altered by the choice of compounds. Compounds which contain an average of greater than two mercapto groups per molecule are capable of forming three-dimensional cross-linked products upon exposure to oxygen. As the average number of mercapto groups per molecule increases, the cross-link density of the resulting product increases and this increase is generally evidenced by an increase in hardness and brittleness.

Thus, OSO Copolymers containing an average of greater than two mercapto groups per molecule can be the sole component in a composition curable to an elastomer. By including an LMW Compound such as one which contains six mercapto groups per molecule, such as dipentaerythritol hexakis(3-mercaptopropionate), in the formulation as a cross-linking agent, the hardness of the cured product can be increased. Sufficient amounts of such a cross-linking agent can be used to produce a resinous cured product useful as a hard coating. Organosilicon compounds which contain an average of three or more mercapto groups per molecule, such as a cyclic polydiorganosiloxane of the average formula $\{HSCH_2CH_2CH_2(Me)SiO\}_{\sim 4}$, where Me is $—CH_3$, can also function as cross-linking agents. OS Polymers or OP Polymers can also be used as cross-linking agents in compositions containing compounds or polymers which possess an average of only two mercapto groups per molecule provided that the polymer used as a cross-linking agent contains a sufficient number of mercapto groups per molecule to result in a satisfactory product.

Generally, elastomeric or resinous products result when the average number of mercapto groups per molecule based on the total amount of organic compound, organosilicon compound and/or OSO Copolymer present is greater than or equal to approximately three. As a general rule, the elongation value at break of the product formed upon exposure to oxygen increases as the average number of mercapto groups per molecule approaches two, particularly when linear polymers or compounds are employed. Thus, in applications where an elastomeric sealant is required which is capable of a high degree of elongation without tearing, such as for sealing concrete expansion joints, it is preferable to use formulations in which a major amount of the mercapto-functional compound is composed of linear molecules having an average of two mercapto groups per molecule.

Compositions composed of compounds which contain an average of only two mercapto groups per molecule, especially linear compounds, are generally only capable of polymerization by chain-extension and produce tacky gums unless the mercapto-functional compounds themselves are sufficiently cross-linked or are high enough in molecular weight to result in a tack-free surface after exposure to oxygen. Such tacky gums could be used as a soft protecting coating which is later removed by peeling the coating away from the article to be protected or by removing the coating with solvent. Such compositions could also find use as impregnants for porous materials which absorb the composition.

It is believed that compositions of the present invention polymerize or cure to form higher molecular weight products by the formation of disulfide (—SS—) bonds upon exposure to oxygen due to the action of the iron carbonyl catalyst which action is further accelerated at the surface by acids meeting the above three criteria. Once the surface has polymerized or cured, the compositions appear to polymerize or cure at approximately the same rate as the same compositions which do not contain acids. The compositions polymerize or cure at room temperature and appear to polymerize or cure from the surface in contact with oxygen inward. The polymerization or cure rate of the unexposed material appears to be affected by the ability of oxygen to diffuse through the polymerized or cured layer above because the rate appears to slow as the layer above thickens. The oxygen permeability of organosiloxanes is known to be much higher than that of organic polymers, therefore, the amount of time required to polymerize or cure to a particular thickness at room temperature will generally increase as the ratio of organic compound to organosilicon compound content is increased. In thin coatings, the increase in cure time is generally not significant. However, in compositions such as elastomeric sealants which are extruded to a thickness of greater than approximately 3 millimeters, such effect can be significant and the rate of polymerization or cure should be evaluated to insure that a formulation with an acceptable rate of cure is obtained.

One advantage of compositions of the present invention is that such compositions polymerize or cure at room temperature. Thin coatings of up to approximately one millimeter thick can be formed within 24 hours after exposure to oxygen at room temperature (paint films generally range from 0.01 to 0.5 millimeters in thickness). Compositions which are used to impregnate porous materials which may be sensitive to heat such as leather can be polymerized or cured at room temperature. Elastomeric sealant compositions which cure to thicknesses of 3 millimeters in approximately two weeks at room temperature can be obtained. Room temperature polymerization or cure will be satisfactory for many applications, but heating can also be used to accelerate the rate of cure. Polymerization or cure is initiated simply by exposing the compositions to atmospheric oxygen and requires neither mixing nor addition of any catalysts by the end-user prior to use. Other applications and advantages possessed by compositions of the present invention will be readily apparent to those skilled in the art.

The following examples are intended as being merely illustrative and are not to be construed as limiting the scope of the present invention, which is properly defined by the appended claims. All parts and percentages reported in the following examples are by weight unless otherwise indicated.

EXAMPLE 1

The preparation and cure of a one-package oxygen-curable composition possessing rapid surface cure was demonstrated by this example. For purposes of comparison, a composition which did not contain acid was prepared. The pendant-functional mercaptopolydiorganosiloxane (OS Polymer) used was a trimethylsiloxy-endblocked copolymer of dimethylsiloxane and 3-mercaptopropylmethylsiloxane units, there being about 5 mole percent of 3-mercaptopropylmethylsiloxane units present based upon the total moles of siloxane units present. This OS Polymer (hereinafter referred to as Polymer A) had a viscosity of about 1.2 Pascal-seconds (Pa·s) at 25° C.

The silicon-free mercapto-functional polymer (hereinafter referred to as Polymer B) was a commercially-obtained polydisulfidepolymercaptan polymer of the general formula HS(CH$_2$CH$_2$OCH$_2$OCH$_2$CH$_2$SS)$\sim_{23}$CH$_2$CH$_2$OCH$_2$OCH$_2$CH$_2$SH which reportedly contained approximately 2% of trifunctional molecules to produce branching in the polymer, had a viscosity of 40 Pa·s at 25° C. and contained 1.8 weight percent of mercapto groups.

Two bases were prepared: Base 1 which consisted of 50 grams of Polymer A, 25 grams of Polymer B and 0.4 grams of 2-ethylhexanoic acid; and Base 2 which consisted of 50 grams of Polymer A and 25 grams of Polymer B. Base 1 and Base 2 were each placed in a separate low-density polyethylene SemKit® tube (commercially available from Semco, Inc., division of Products Research and Chemical Corp., Glendale, CA) which is a cylinder having the appearance of a tube commonly used for caulking compounds, contains a means for stirring the contents and is designed to be placed in a vacuum to remove volatile materials from compositions placed inside the tube. Because the bases were prepared in the presence of air, each was de-aired by subjecting it to a vacuum of 30 millimeters of mercury for approximately 15 minutes. A seal was then placed on the back of each tube. Three grams of a 10 percent by weight solution of iron pentacarbonyl in mineral oil was injected into each sealed SemKit® tube and the stirrer was used to evenly incorporate the catalyst solution into each base.

A sample of each catalyzed mixture was then extruded into the presence of air at room temperature (22° C.).

The acid accelerated sample formed a surface layer of gelled product in 90 seconds and after 110 seconds had formed a glossy layer which was tack-free to a touch with a sheet of polyethylene and was approximately 0.2 millimeters (mm) thick. The sample prepared without acid accelerator was unchanged after 5 minutes exposure to air. After 20 minutes, a tacky surface layer had formed which became tack-free and glossy after 25 minutes. When a 3 millimeter thick bead of the above compositions are extruded into, for example, a horizontal wall joint, a completely cured elastomeric product useful as a seal for such joint is formed after several days exposure to air at room temperature.

The viscosity of the catalyzed compositions stored at room temperature in the low-density polyethylene tubes (this type of polyethylene is slightly oxygen permeable) was essentially unchanged after 3 days. After 3 days storage, the acid accelerated sample formed a surface skin in 80 seconds after exposure to air at room temperature while the other sample required 15 minutes to do the same.

EXAMPLE 2

Accelerated surface cure resulting from the addition of acid to a mixture of terminal-functional mercaptopolydiorganosiloxane (OS Polymer) and a silicon-free lower molecular weight organic compound (LMC Compound) was demonstrated by this example. The OS Polymer was a polydimethylsiloxane endblocked with 3-mercaptopropyldimethylsiloxy endblocking units and is hereinafter referred to as Polymer C. Polymer C was prepared by adding 2489.5 grams of cyclic polydimethylsiloxane mixture having an average formula (Me$_2$SiO)$\sim_4$, where Me is —CH$_3$, and 10.5 grams of sym-tetramethyl bis(3-mercaptopropyl)disiloxane to a 5 liter, 3-necked flask equipped with a stirrer, reflux condenser, thermometer and nitrogen sparge tube. The contents were heated to 65° C. while stirring and purging with dry nitrogen gas. at 65° C., 1.47 ml (2.5 grams) of trifluoromethanesulfonic acid was added and the reflux condenser was replaced with a condenser which did not permit atmospheric moisture to reach the contents of the flask. The contents were maintained at 65° C. for 23 hours, the catalyst was neutralized with about 15 grams of sodium bicarbonate at room temperature, filtered and the volatiles were removed by vacuum distilling the filtrate at less than 2 millimeters of mercury pressure until the distillation pot temperature was 145° C. Polymer C contained 0.18 percent by weight mercapto groups (determined by titrating with silver nitrate solution), had a viscosity of 14.24 Pa·s at 25° C. and the number average molecular weight of Polymer C determined by fast gel permeation chromatograph analysis using polydimethylsiloxane reference standards was 32,300.

Sample 1 consisted of 20 grams of Polymer C, 2 grams of dipentaerythritol hexakis(3-mercaptopropionate) and 0.2 grams of 2-ethylhexanoic acid. Sample 2 consisted of 20 grams of Polymer C and 2 grams of dipentaerythritol hexakis(3-mercaptopropionate). Each sample was mixed in an open metal can having a volume of approximately 60 milliliters. 0.5 grams of iron pentacarbonyl (neat) was quickly stirred into each mixture in the presence of air.

Catalyzed Sample 1 formed a surface layer of product after 8 minutes at room temperature (22° C.). The surface of catalyzed Sample 2 remained unchanged after 15 minutes and required 95 minutes to form a surface layer of product. After 24 hours at room temperature in the presence of air, both samples exhibited surface layers of product approximately 0.9 mm thick.

That which is claimed is:

1. A composition of matter, stable in the absence of oxygen, which consists essentially of a product obtained by mixing the following substantially in the absence of oxygen
   (A) 100 parts by weight of an ingredient selected from the group consisting of
      (1) at least one mercapto-functional copolymer having both organic compound segments and organosilicon compound segments, there being an average of at least two mercapto groups per copolymer molecule and
      (2) a mixture of at least two different types of components, said components being selected from the group consisting of (a) at least one copolymer as described in (A)(1) above, (b) at least one mercapto-functional organic compound which contains an average of at least two mercapto groups per molecule and (c) at least one mercapto-functional organosilicon compound selected from the group consisting of mercapto-functional organosilanes and mercapto-functional organosiloxanes,
   wherein
   each organic compound segment and mercapto-functional organic compound is free of silicon atoms, aliphatic unsaturation and radicals which are reactive with mercapto groups at room temperature;
   said mercapto-functional organosilanes have an average of at least two mercapto groups per molecule and are of an average formula

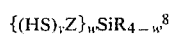

where
   each Z is a divalent or polyvalent hydrocarbon radical free of aliphatic unsaturation, the valence of Z being v+1,
   each $R^8$ is a monovalent hydrocarbon radical free of aliphatic unsaturation or $OR^7$,
   each $R^7$ is an alkyl radical of 1 to 4 inclusive carbon atoms,
   v has a value greater than 0,
   w has a value of from 1 to 3 inclusive and the sum of v+w has a value of at least 3; and
   said mercapto-functional organosiloxanes have an average of at least two mercapto-functional siloxane units per molecule selected from the group consisting of mercapto-functional siloxane units of the average unit formula

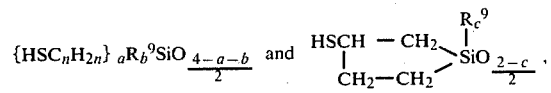

any other siloxane units present having the average unit formula

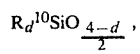

where
   each $R^{10}$ is an organic radical selected from the group consisting of $R^9$ and 3,3,3-trifluoropropyl radicals,
   each $R^9$ is $R^6$ or $OR^7$,
   each $R^6$ is an alkyl radical of 1 to 4 inclusive carbon atoms or phenyl radical,
   n has a value of from 2 to 4 inclusive,
   a has a value of from 1 to 2 inclusive,
   b has a value of from 0 to 2 inclusive,
   c has a value of from 0 to 1 inclusive,
   d has a value of from 0 to 3 inclusive and the sum of a+b has a value of from 1 to 3 inclusive, and the ratio of the total $R^6$, $HSC_nH_{2n}$-,

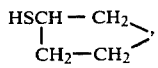

and 3,3,3-trifluoropropyl radicals to silicon atoms in the mercapto-functional organosiloxane is in the range of 0.98/1 to 3.00/1;
(B) 0 to 200 parts by weight of at least one filler;
(C) a catalytic amount of an iron carbonyl compound selected from the group consisting of $Fe(CO)_5$, $Fe_2(CO)_9$, $Fe_3(CO)_{12}$, dicyclopentadienyldiiron tetracarbonyl, butadieneiron tricarbonyl, and cyclohexadieneiron tricarbonyl; and
(D) 0.1 to 6 parts by weight of an acid which meets the following criteria:
   (1) it must be compatible with the mixed composition,
   (2) it must be a proton donor, and
   (3) the dissociation constant of the acid in an aqueous solution must be greater than $10^{-5}$.

2. The composition as claimed in claim 1 wherein the catalytic amount of (C) is in the range of 0.1 to 6 parts by weight of iron carbonyl compound per 100 parts by weight of (A).

3. The composition as claimed in claim 2 wherein the iron carbonyl compound is Fe(CO)$_5$.

4. The composition as claimed in claim 3 wherein the acid is 2-ethylhexanoic acid.

5. The composition as claimed in claim 4 wherein the ingredient (A) is a mixture of (A)(2)(b) and (A)(2)(c) wherein (A)(2)(b) is a mercapto-functional organic compound selected from the group consisting of R$^4$C(CH$_2$OOCR$^2$SH)$_3$, C(CH$_2$OOCR$^2$SH)$_4$, (HSR$^2$COOCH$_2$)$_3$CCH$_2$OCH$_2$C(CH$_2$OOCR$^2$SH)$_3$, {HSR$^2$COO(H)C}{CH$_2$OOCR$^2$SH}$_2$ and (HSR$^2$COOCH$_2$)$_3$CCH$_2$OCH$_2$C(CH$_2$OOCR$^2$SH)$_2$CH$_2$OCH$_2$C(CH$_2$OOCR$^2$SH)$_3$ wherein R$^2$ is alkylene of 1 to 20 inclusive carbon atoms or phenylene and R$^4$ is an alkyl radical of 1 to 2 inclusive carbon atoms.

6. The composition as claimed in claim 4 wherein the ingredient (A) is a mixture of (A)(2)(b) and (A)(2)(c) wherein (A)(2)(b) is an organic polydisulfidepolymercaptan polymer having a molecular weight of approximately 500 to 12,000 which contains multiply recurring disulfide (—SS—) linkages between carbon atoms, exists as a liquid at 25° C. and contains an average of at least two mercapto groups per molecule.

7. The composition as claimed in claims 5 or 6 wherein (A)(2)(c) is a pendant-functional mercaptopolydiorganosiloxane containing R$_3^6$SiO$_{0.5}$ endblocking siloxane units and mercapto-functional siloxane units selected from the group consisting of

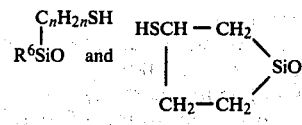

any remaining siloxane units being R$_2^6$SiO, wherein the average number of mercapto-functional siloxane units per molecule is greater than 2 and the number average molecular weight of the pendant-functional mercaptopolydiorganosiloxane is less than 400,000.

8. The composition as claimed in claim 7 wherein R$^6$ is methyl, n is 3, and the pendant-functional mercaptopolydiorganosiloxane has a number average molecular weight of less than 100,000 and contains a sufficient number of mercapto-functional siloxane units to result in a weight percantage of mercapto groups in the range of 0.14 to 2.5 percent based on the total weight of pendant-functional mercaptopolydiorganosiloxane.

9. The composition as claimed in claims 5 or 6 wherein (A)(2)(c) is a hybrid-functional mercaptopolydiorganosiloxane containing two mercapto-functional siloxane units selected from the group consisting of (HSC$_n$H$_{2n}$)R$_2^6$SiO$_{0.5}$, (HSC$_n$H$_{2n}$)(R$^7$O)$_2$SiO$_{0.5}$,

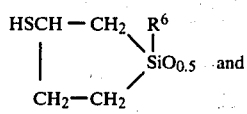 and 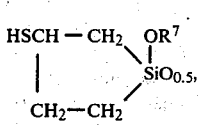

and at least one mercapto-functional siloxane unit selected from the group consisting of (HSC$_n$H$_{2n}$)R$^6$SiO and

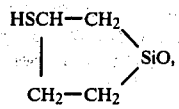

any remaining units being R$_2^6$SiO, wherein the number average molecular weight of the hybrid-functional mercaptopolydiorganosiloxane is less than 400,000.

10. The composition as claimed in claims 5 or 6 wherein (A)(2)(c) is a hybrid-functional mercaptopolydiorganosiloxane containing two mercapto-functional siloxane units selected from the group consisting of (HSCH$_2$CH$_2$CH$_2$)(CH$_3$)$_2$SiO$_{0.5}$ and

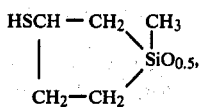

and at least one mercapto-functional siloxane unit selected from the group consisting of (HSCH$_2$CH$_2$CH$_2$)(CH$_3$)SiO and

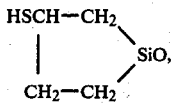

any remaining units being (CH$_3$)$_2$SiO, wherein the hybrid-functional mercaptopolydiorganosiloxane has a number average molecular weight of less than 100,000 and contains a sufficient number of mercapto-functional siloxane units to result in a weight percentage of mercapto groups in the range of 0.14 to 3 percent based on the total weight of hybrid functional mercaptopolydiorganosiloxane.

11. The composition as claimed in claim 5 wherein (A)(2)(c) is a terminal-functional mercaptopolydiorganosiloxane containing mercapto-functional siloxane units selected from the group consisting of HSC$_n$H$_{2n}$(R$^6$)$_2$SiO$_{0.5}$, HSC$_n$H$_{2n}$(R$^7$O)$_2$SiO$_{0.5}$,

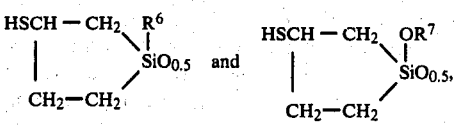

any remaining siloxane units being R$_2^6$SiO, wherein the number average molecular weight of the terminal-functional mercaptopolydiorganosiloxane is less than 400,000.

12. The composition as claimed in claim 5 wherein (A)(2)(c) is a terminal-functional mercaptopolydiorganosiloxane containing mercapto-functional siloxane units selected from the group consisting of (HSCH$_2$CH$_2$CH$_2$)(CH$_3$)$_2$SiO$_{0.5}$ and

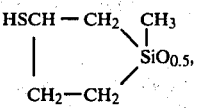

any remaining siloxane units being (CH$_3$)$_2$SiO, wherein said terminal-functional mercaptopolydiorganosiloxane has a number average molecular weight of less than 100,000 and contains a sufficient number of mercapto-functional siloxane units to result in a weight percentage of mercapto groups in the range of 0.07 to 0.45 percent based on the total weight of terminal-functional mercaptopolydiorganosiloxane.

13. A composition which consists essentially of a product formed upon exposure of the composition of claim 2 to oxygen.

14. A cured composition which consists essentially of a product formed upon exposure of the composition of claim 5 to oxygen.

15. A cured composition which consists essentially of a product formed upon exposure of the composition of claim 6 to oxygen.

16. A cured composition which consists essentially of a product formed upon exposure of the composition of claim 8 to oxygen.

17. A cured composition which consists essentially of a product formed upon exposure of the composition of claim 10 to oxygen.

18. A cured composition which consists essentially of a product formed upon exposure of the composition of claim 12 to oxygen.

19. A method of forming a higher molecular weight product which consists essentially of the steps of
(I) Mixing
(A) 100 parts by weight of an ingredient selected from the group consisting of
(1) at least one mercapto-functional copolymer having both organic compound segments and organosilicon compound segments, there being an average of at least two mercapto groups per copolymer molecule and
(2) a mixture of at least two different types of components, said components being selected from the group consisting of (a) at least one copolymer as described in (A)(1) above, (b) at least one mercapto-functional organic compound which contains an average of at least two mercapto groups per molecule and (c) at least one mercapto-functional organosilicon compound selected from the group consisting of mercapto-functional organosilanes and mercapto-functional organosiloxanes,
wherein
each organic compound segment and mercapto-functional organic compound is free of silicon atoms, aliphatic unsaturation and radicals which are reactive with mercapto groups at room temperature;
said mercapto-functional organosilanes have an average of at least two mercapto groups per molecule and are of an average formula
$\{(HS)_v Z\}_w SiR^8_{4-w}$ where
each Z is a divalent or polyvalent hydrocarbon radical free of aliphatic unsaturation, the valence of Z being v+1,
each $R^8$ is a monovalent hydrocarbon radical free of aliphatic unsaturation or $OR^7$,
each $R^7$ is an alkyl radical of 1 to 4 inclusive carbon atoms,
v has a value greater than 0,
w has a value of from 1 to 3 inclusive and the sum of v+w has a value of at least 3; and
said mercapto-functional organosiloxanes have an average of at least two mercapto-functional siloxane units per molecule selected from the group consisting of mercapto-functional siloxane units of the average unit formula

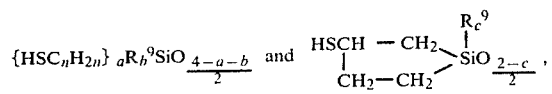

any other siloxane units present having the average unit formula $R_d^{10} SiO_{\frac{4-d}{2}}$ , where
each $R^{10}$ is an organic radical selected from the group consisting of $R^9$ and 3,3,3-trifluoropropyl radicals,
each $R^9$ is $R^6$ or $OR^7$,
each $R^6$ is an alkyl radical of 1 to 4 inclusive carbon atoms or phenyl radical,
n has a value of from 2 to 4 inclusive,
a has a value of from 1 to 2 inclusive,
b has a value of from 0 to 2 inclusive,
c has a value of from 0 to 1 inclusive,
d has a value of from 0 to 3 inclusive and the sum of a+b has a value of from 1 to 3 inclusive, and the ratio of the total $R^6$, $HSC_nH_{2n}-$,

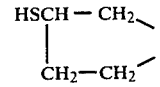

and 3,3,3-trifluoropropyl radicals to silicon atoms in the mercapto-functional organosiloxane is in the range of 0.98/1 to 3.00/1;
(B) a catalytic amount of an iron carbonyl compound selected from the group consisting of $Fe(CO)_5$, $Fe_2(CO)_9$, $Fe_3(CO)_{12}$, dicyclopentadienyldiiron tetracarbonyl, butadieneiron tricarbonyl and cyclohexadieneiron tricarbonyl; and
(C) 0.1 to 6 parts by weight of an acid which meets the following criteria: (1) it must be compatible with the mixed composition, (2) it must be a proton donor and (3) the dissociation constant of the acid in an aqueous solution must be greater than $10^{-5}$, to form a mixture and
(II) exposing said mixture to oxygen.

20. The method as claimed in claim 19 wherein the amount of iron carbonyl compound is in a range of 0.1 to 6 parts by weight per 100 parts by weight of (I)(a) and the iron carbonyl compound is $Fe(CO)_5$.

21. The method as claimed in claim 19 wherein the mixture of (I) additionally contains up to 200 parts by weight of at least one filler per 100 parts by weight of (I)(a).

22. A composition which consists essentially of the higher molecular weight product obtained in accordance with the method of claim 19.

23. A composition which consists essentially of the higher molecular weight product obtained in accordance with the method of claim 20.

24. A composition which consists essentially of the higher molecular weight product obtained in accordance with the method of claim 21.

25. The composition as claimed in claims 1, 2 or 3 which contains at least one filler.

26. The composition as claimed in claim 13 which contains at least one filler.

UNITED STATES PATENT AND TRADEMARK OFFICE
CERTIFICATE OF CORRECTION

PATENT NO. : 4,267,296   Page 1 of 2
DATED : May 12, 1981
INVENTOR(S) : GARY R. HOMAN It is certified that error appears in the above-identified patent and that said Letters Patent are hereby corrected as shown below:

Column 2, line 39, the phrase "compounds of segments" should read --compounds or segments--.

Column 3, line 33, the formula "$\{(HS)_v Z\}_w SiR_{4-w}^8$" should read --$\{(HS)_v Z\}_w SiR_{4-w}^8$--.

Column 5, line 1, the word "being" should read --begin--.

Column 5, line 20, the word "is" should read --if--.

Column 6, line 60, the word "mixture" should read --mixtures--.

Column 7, line 49, the formula "$\{(HS)_v Z\}_w SiR_{4-w}^8$" should read --$\{(HS)_v Z\}_w SiR_{4-w}^8$--.

Column 11, line 25, the formula "$\{HSCH_2CH_2CH_2(CH_3)SiO\}_{\sim 4}$" should read --$\{HSCH_2CH_2CH_2(CH_3)SiO\}_{\sim 4}$--.

Column 19, line 16, the word "chromatograph" should read --chromatographic--.

UNITED STATES PATENT AND TRADEMARK OFFICE
CERTIFICATE OF CORRECTION

PATENT NO. : 4,267,296
DATED : May 12, 1981
INVENTOR(S) : GARY R. HOMAN

It is certified that error appears in the above–identified patent and that said Letters Patent are hereby corrected as shown below:

Column 19, line 68, the formula "$\{(HS)_v Z\}_w SiR_{4-w}{}^8$" should read --$\{(HS)_v Z\}_w SiR^8{}_{4-w}$--.

Column 23, line 54, the formula "$\{(HS)_v Z\}_w SiR_{4-w}{}^8$" should read --$\{(HS)_v Z\}_w SiR^8{}_{4-w}$--.

Signed and Sealed this

Second Day of February 1982

[SEAL]

Attest:

GERALD J. MOSSINGHOFF

Attesting Officer — Commissioner of Patents and Trademarks